United States Patent [19]
Ishii et al.

[11] Patent Number: 5,551,932
[45] Date of Patent: Sep. 3, 1996

[54] ENGINE IDLE CONTROL DURING BRAKING WITH LOCKUP CLUTCH BEING RELEASED

[75] Inventors: Shigeru Ishii, Atsugi; Yoshihide Shinso, Zama; Kosei Murata, Tsuchiura; Shigeki Shimanaka, Hadano; Shuji Kurokawa, Machida; Hideharu Yamamoto, Odawara; Makoto Shiomori, Kikuchi-Gun, all of Japan

[73] Assignee: Nissan Motor Co., Ltd., Yokohama, Japan

[21] Appl. No.: 435,131

[22] Filed: May 5, 1995

[30] Foreign Application Priority Data

May 6, 1994 [JP] Japan ................................... 6-094334

[51] Int. Cl.$^6$ .............................. F16H 9/00; F16H 61/00; B60K 41/28
[52] U.S. Cl. ........................... 477/168; 477/170; 477/171
[58] Field of Search ............................ 477/168, 169, 477/170, 171, 173

[56] References Cited

FOREIGN PATENT DOCUMENTS 57-161358 10/1982 Japan .
5-193402  8/1993 Japan .

*Primary Examiner*—Khoi Q. Ta
*Attorney, Agent, or Firm*—Foley & Lardner

[57] ABSTRACT

An apparatus is disclosed which prevents occurrence of an engine stalling in a power train of an automotive vehicle, including an engine and a lock-up type automatic transmission. The apparatus is operative during a braking operation of the vehicle and includes an engine controller to perform an idling speed control for the engine, and a transmission controller to perform a lock-up releasing control for releasing the torque converter from the lock-up mode. When the lock-up releasing control is being performed, the engine controller continuously performs the idling speed control and thereby prevents occurrence of engine stalling.

2 Claims, 3 Drawing Sheets

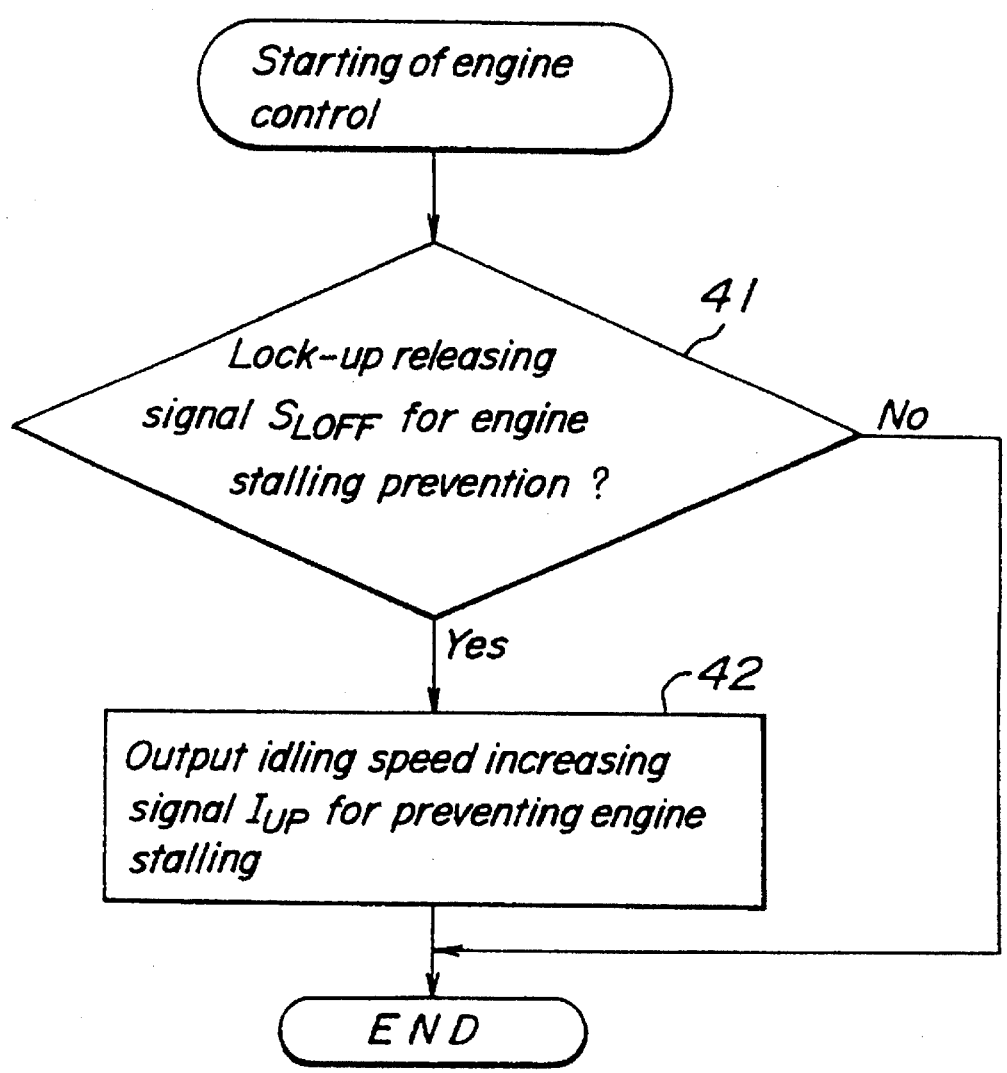

ENGINE IDLE CONTROL DURING BRAKING WITH LOCKUP CLUTCH BEING RELEASED

BACKGROUND OF THE INVENTION

1. Field of the Invention

The present invention relates generally to a control system for a power train of an automotive vehicle, and more particularly to an apparatus for preventing occurrence of engine stalling during braking of the vehicle.

2. Description of the Related Art

An automatic transmission in combination with an engine forms a power train of an automotive vehicle and includes a torque converter for absorbing fluctuation in the output torque and multiplying the torque. Since the torque converter performs a power transmission by utilizing a fluid transmission between input and output elements, the transmission efficiency of the torque converter is relatively low. Therefore, it is a recent trend to employ lock-up type torque converters wherein the input and output elements can be locked up, i.e., directly connected with each other, in a driving condition of the vehicle in which the abovementioned functions of the torque converter are unnecessary.

On the other hand, for providing an improved fuel economy, attempts have been made to lower a lock-up vehicle speed and enlarge the lock-up region of the torque converter. The lowered lock-up vehicle speed frequently results in a driving condition in which the vehicle is driven at a low speed with the torque converter locked up. In this instance, when a relatively hard braking is performed, the engine tends to undergo stalling due mainly to a response delay in releasing the torque converter from the lock-up state.

For avoiding occurrence of such engine stalling, there have been various proposals. For example, JP-A-57-161,358 discloses a control system for an automatic transmission, which is capable, in addition to a normal lock-up control of the torque converter, of releasing the converter from the lock-up mode for a period from an instant when the brake pedal is depressed to another instant when an accelerator pedal is subsequently depressed. Further, JP-A-5-193,402 discloses an engine control system wherein an idling speed of the engine is increased during a braking operation.

One may consider it readily possible to combine the two types of controls mentioned above, with an attempt to more positively prevent engine stalling during a braking operation. However, such a combination may deteriorate the drivability of the vehicle particularly when the brake pedal is repeatedly depressed and released for controlling the vehicle speed during a down-hill driving condition. On such occasion, during a period in which the lock-up releasing control of the torque converter is being performed by a transmission controller on the basis of a braking switch signal and an idling switch signal, when the idling speed control of the engine is repeatedly performed by an engine controller upon depression of the brake pedal, the vehicle may be repeatedly subjected to acceleration and deceleration thereby deteriorating the drivability of the vehicle.

SUMMARY OF THE INVENTION

It is an object of the present invention to provide an improved apparatus for preventing occurrence of engine stalling during braking of the vehicle, which performs a lock-up releasing control of the torque converter and an idling speed control of the engine without deteriorating the drivability of the vehicle.

The present invention is based on a recognition that, when the engine stalling is to be prevented by a lock-up releasing control of the torque converter and an idling speed control of the engine, a refined drivability of the vehicle can still be maintained by supplying an engine controller with a signal which indicates that the lock-up releasing control is being performed.

According to the present invention, there is provided an apparatus for preventing occurrence of an engine stalling in a power train of an automotive vehicle, which is comprised of an engine and a lock-up type automatic transmission driven by the engine, said automatic transmission including a torque converter which can be set in a lock-up mode, said apparatus being operative during a braking operation of the vehicle for avoiding occurrence of an engine stalling and comprising an engine controller adapted to perform an idling speed control for the engine, and a transmission controller adapted to perform a lock-up releasing control for releasing the torque converter from the lock-up mode, said transmission controller being adapted to generate an output signal which indicates that the lock-up releasing control for the transmission is being performed, said apparatus further comprising a signal transmission means for transmitting said output signal from the transmission controller to the engine controller, and said engine controller being responsive to said output signal from the transmission controller, for performing the idling speed control of the engine and thereby preventing occurrence of an engine stalling.

With such an arrangement of the present invention, when a brake pedal is depressed to perform a braking operation of the vehicle, the engine controller performs an idling speed control of the engine to prevent occurrence of engine stalling. At the same time, the transmission controller performs a lock-up releasing control for releasing the torque converter from the lock-up mode to thereby prevent occurrence of engine stalling.

Meanwhile, during the lock-up releasing control of the torque converter, the transmission controller generates an output signal which indicates that the lock-up releasing control for the transmission is being performed, and which is then supplied to the engine controller through the signal transmission means. The engine controller is responsive to the output signal from the transmission controller and continuously performs the idling speed control of the engine even when the brake pedal is repeatedly depressed during the lock-up releasing control of the torque converter. It is thus possible to prevent occurrence of engine stalling and avoid repeated acceleration and deceleration of the vehicle, thereby maintaining a refined drivability of the vehicle.

Advantageously, the apparatus according to the present invention further comprises a time measuring means for measuring a time from a first instant when an accelerator pedal is released to a second instant when a brake pedal is depressed, wherein the transmission controller performs the lock-up releasing control if the time measured by the measuring means is shorter than a predetermined time. In this instance, the lock-up releasing control and the idling speed control are performed for preventing occurrence of engine stalling only upon a sudden braking operation wherein the measured time is shorter than the predetermined time. In other words, when an engine stalling is not likely to occur, the lock-up releasing control and the idling speed control may be deemed unnecessary so that they are not performed.

BRIEF DESCRIPTION OF THE DRAWINGS

The present invention will now be described in further detail hereinafter, by referring to a specific embodiment shown in the accompanying drawings, in which:

FIG. 3 is a flowchart illustrating a program for performing an idling speed control operation, to be executed by an engine controller in the system of FIG. 1.

DETAILED DESCRIPTION OF THE PREFERRED EMBODIMENT

Figure 1:
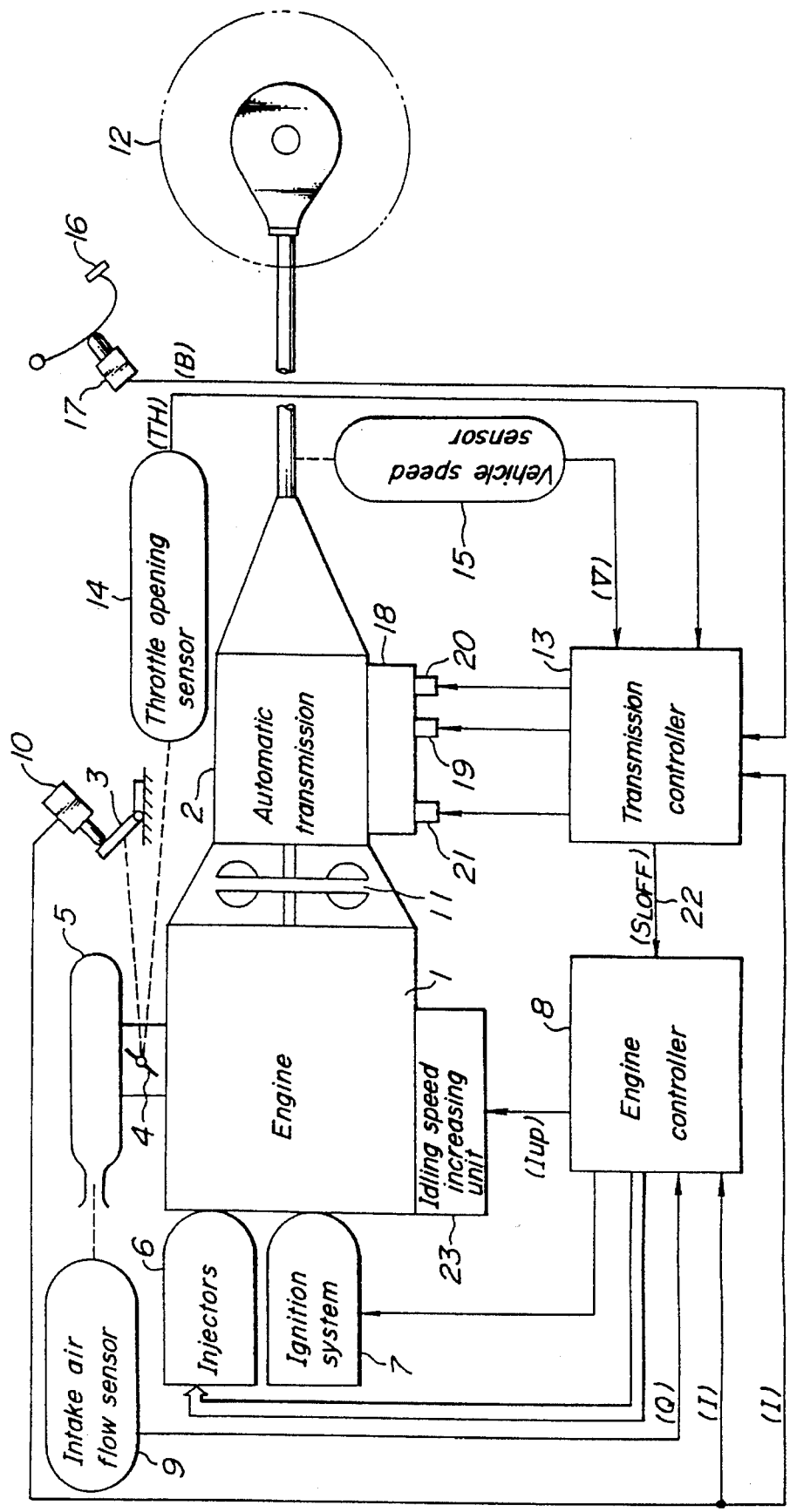
FIG. 1 is a schematic diagram illustrating the control system of a vehicle power train for use in a vehicle, to which the present invention can be applied.

Referring now to FIG. 1, there is illustrated an apparatus according to the present invention which prevents occurrence of engine stalling in a vehicle power train. The power train includes an engine 1 and an automatic transmission 2 which are connected in tandem with each other through a lock-up type torque converter 11.

The engine 1 includes a throttle valve 4 of which the throttle opening is variable by a depression amount of an accelerator pedal 3, and intakes air of an amount corresponding to the throttle opening and an engine speed through an air cleaner 5. The engine 1 is further provided with a group of injectors 6 for respective cylinders, and also with an ignition system 7. These elements are controlled by an engine controller 8. To this end, the engine controller 8 is supplied with an intake air flow signal Q from an intake air flow sensor 9, and an idling signal I from an idling switch 10 which is turned on when the accelerator pedal 3 is released.

Based on such input information, the engine controller 8 performs a fuel injection control by which a predetermined amount of fuel is injected to predetermined cylinders from the relevant injectors 6, as well as a fuel cutting operation for ceasing the fuel supplying during inertial run, synchronously with the operation of the engine 1. The engine controller 8 further controls the ignition system 7 to ignite an ignition plug corresponding to a predetermined cylinder with a predetermined timing, synchronously with the operation of the engine 1 according to the aforementioned input information. Thus the engine 1 can be operated and a fuel cutting can be performed during an inertial driving condition of the vehicle, both in a predetermined manner.

The output power of the engine 1 is transmitted to the automatic transmission through the torque converter 11 which, as mentioned above, is of a lock-up type. Thus, in a lock-up region of the torque converter in which the torque multiplying function and the torque fluctuation absorbing function are not required, the torque converter 11 is put into a lock-up mode in which the input and output elements are directly connected with each other. In the other operating region, the torque converter 11 is put into a converter mode in which the lock-up mode is canceled. The automatic transmission 2 transmits the engine power to driving wheels 12 of the vehicle through the torque converter 11, by changing the speed at a gear ratio corresponding to a selected gear range.

The shift control of the automatic transmission 2 and the lock-up control of the torque converter 11 are performed by a transmission controller 13. To this end, the controller 13 is supplied with a throttle opening signal TH from a throttle opening sensor 14, the idling signal I from the idling switch 10, a vehicle speed signal V from a vehicle speed sensor 15, and a braking signal B from a braking switch 10 which is turned on in response to the depression of a brake pedal 16.

The transmission controller 13 selects a gear range which is suitable for a driving condition of the vehicle as evaluated from the throttle opening TH and the vehicle speed V. Then, the transmission controller 13 shifts a current gear range to the selected range by determining the respective ON/OFF states of shift solenoids 19 and 20 of a control valve 18. Moreover, the transmission controller 13 judges from the input information whether the current operating state of the torque converter is within the lock-up region in which the torque multiplying function and the torque fluctuation absorbing function are not required. If the current operating state of the torque converter is within the lock-up region, the transmission controller 13 turns on a lock-up solenoid 21 of the control valve 18 to put the torque converter 11 into a lock-up mode in which the input and output elements of the torque converter are directly connected with each other. If the current operating state of the torque converter does not belong to the lock-up region, the transmission controller 13 puts the torque converter 11 into a converter mode by turning off the lock-up solenoid 21.

Figure 2:
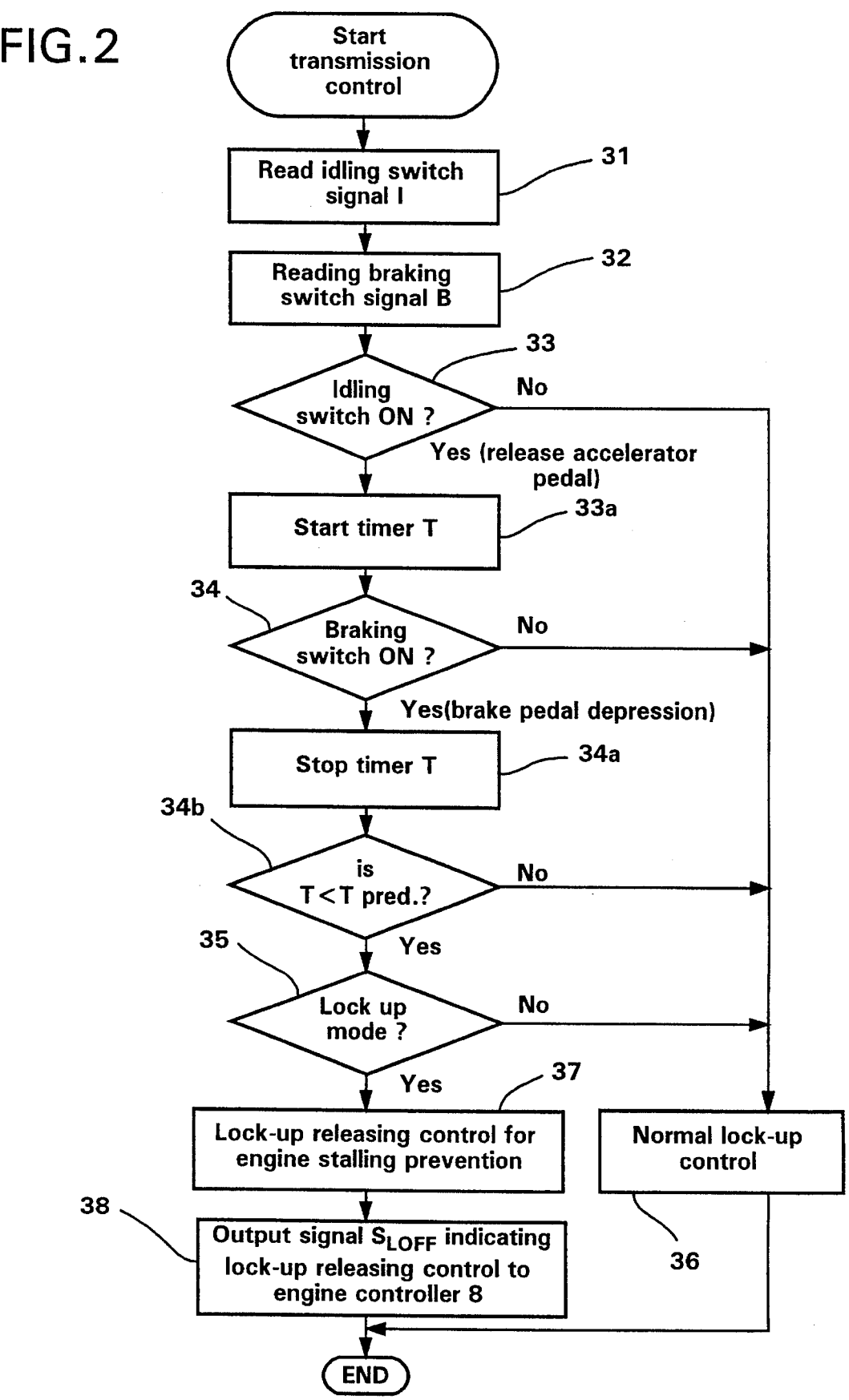
FIG. 2 is a flowchart illustrating a lock-up control program to be executed by a transmission controller in the system of FIG. 1.

In this connection, the transmission controller 13 may execute a control program illustrated in FIG. 2, so as to perform a normal lock-up control and a lock-up releasing control for preventing occurrence of engine stalling.

As shown in the flowchart of FIG. 2, the transmission controller 13 reads the idling signal I from the idling switch 10 in step 31 and also reads the braking signal B from the braking switch 17 in step 32. Further, the transmission controller 13 judges whether or not the torque converter is in a lock-up mode during braking of the vehicle, with the accelerator pedal 3 released and the brake pedal 16 depressed, on the basis of the idling signal I, the braking signal B and a command issued by the lock-up solenoid 21 in steps 33, 34 and 35, respectively. When the acceleration pedal 3 is being depressed, or when the brake pedal 16 is being released, or when the torque converter is in a converter mode, the transmission controller 13 performs the above-mentioned normal lock-up control in step 36.

In contrast, when the torque converter is in a lock-up mode during braking of the vehicle, with the accelerator pedal 3 released and the brake pedal 16 depressed, the transmission controller 13 performs a lock-up releasing control for preventing occurrence of engine stalling in step 37. Moreover, in the next step 38, the transmission controller 13 supplies the engine controller 8 with a signal $S_{LOFF}$ indicating that the lock-up releasing control is being performed.

As illustrated in FIG. 1, a signal transmission path 22 is provided between the transmission controller 13 and the engine controller 8, so as to transmit the signal $S_{LOFF}$ from the transmission controller 13 to the engine controller 8. Furthermore, the engine 1 is provided with an idling speed increasing unit 23 for preventing an occurrence of an engine stalling. This unit 23 is a known device which serves to increase the idling speed of the engine 1 in response to a command $I_{UP}$ from the engine controller 8 during a braking operation in the lock-up mode of the torque converter to thereby prevent occurrence of engine stalling. The engine controller 8 executes a control program shown in FIG. 3 in order to control the idling speed increasing unit 23. Namely, in step 41, the engine controller 8 judges whether or not the signal $S_{LOFF}$ indicating that the lock-up releasing control is being performed has been input from the transmission controller 13. If the signal $S_{LOFF}$ has not been input to the engine controller 8, the control operation is finished and the idling speed increasing unit 23 is not activated. If the signal $S_{LOFF}$ has been input to the engine controller 8, the engine controller outputs an idling speed increasing signal $I_{UP}$ for preventing occurrence of engine stalling to the idling speed increasing unit 23 so that the unit 23 is activated. Thus, the idling speed control for preventing occurrence of engine stalling is performed.

As above stated, during the lock-up releasing control performed by the transmission controller 13 for preventing occurrence of engine stalling in step 37 of FIG. 2, the signal $S_{LOFF}$ indicating such a state is input to the engine controller 8 through the signal transmission path 22. Thus, the engine controller 8 continuously performs the idling speed control for preventing occurrence of engine stalling on the basis of the signal $S_{LOFF}$, regardless of whether the brake pedal 16 is repeatedly depressed. Thus, the present invention serves to maintain a refined drivability of the vehicle due to repeated depression of the brake pedal 16 and a resultant repeated acceleration and deceleration of the vehicle.

In the aforementioned embodiment, the lock-up releasing control for preventing occurrence of engine stalling is performed immediately when it has been found in steps 33 and 34 of FIG. 2 that the acceleration pedal 3 is released and the brake pedal 16 is depressed. However, in many cases, an engine stalling is very likely to occur during a sudden braking which, in turn, can be detected by the length of time from an instant when the accelerator pedal 3 is released to another instant when the brake pedal 16 is depressed. Therefore, it may be more advantageous to modify the apparatus such that the transmission controller 13 measures the time from the instant of releasing the accelerator pedal 3 to the instant of depression of the brake pedal 16. In this case, the lock-up releasing control for preventing occurrence of engine stalling may be performed if the measured time is shorter than a predetermined time. Thus, only when there occurs a sudden braking in which the measured time is shorter than the predetermined time, the aforementioned lock-up releasing control and the idling speed control are carried out for preventing occurrence of engine stalling. In other words, when an engine stalling is not likely to occur, the lock-up releasing control and the idling speed control may be deemed unnecessary so that they are not performed.

It will be appreciated from the foregoing description that the present invention provides an improved apparatus for preventing occurrence of engine stalling during braking of the vehicle, which performs a lock-up releasing control of the torque converter and an idling speed control of the engine without deteriorating the drivability of the vehicle.

While the present invention has been described with reference to specific embodiments, they were presented by way of examples only and it is of course that various changes or modifications may be made without departing from the scope of the invention.

We claim:

1. An apparatus for preventing occurrence of an engine stalling in a power train of an automotive vehicle, which is comprised of an engine and a lock-up type automatic transmission driven by the engine, said automatic transmission including a torque converter which can be set in a lock-up mode, said apparatus being operative during a braking operation of the vehicle for avoiding occurrence of an engine stalling and comprising an engine controller adapted to perform an idling speed control for the engine, and a transmission controller adapted to perform a lock-up releasing control for releasing the torque converter from the lock-up mode, said transmission controller being adapted to generate an output signal which indicates that the lock-up releasing control for the transmission is being performed, said apparatus further comprising a signal transmission means for transmitting said output signal from the transmission controller to the engine controller, and said engine controller being responsive to said output signal from the transmission controller, for performing the idling speed control of the engine and thereby preventing occurrence of an engine stalling.

2. The apparatus according to claim 1, further comprising a time measuring means for measuring a time from a first instant when an accelerator pedal is released to a second instant when a brake pedal is depressed, wherein the transmission controller performs the lock-up releasing control if the time measured by the measuring means is shorter than a predetermined time.

* * * * *